Oct. 2, 1923.
E. F. HAPPENSACK
MILL AND PRESS
Filed Oct. 20, 1921
1,469,724
2 Sheets-Sheet 1
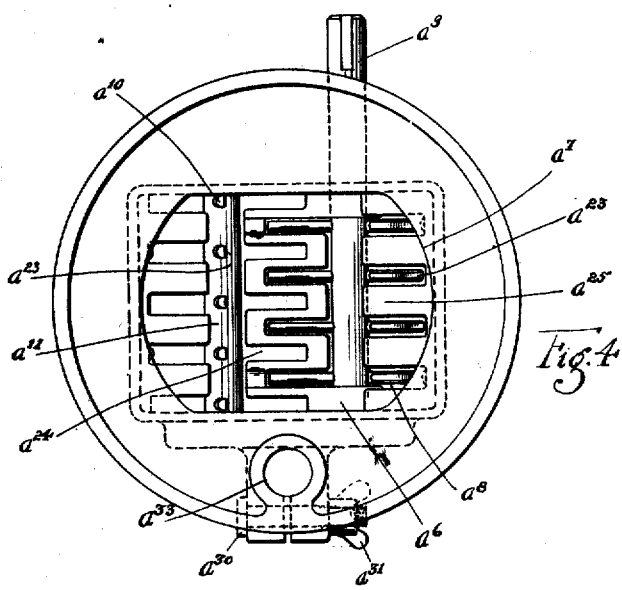
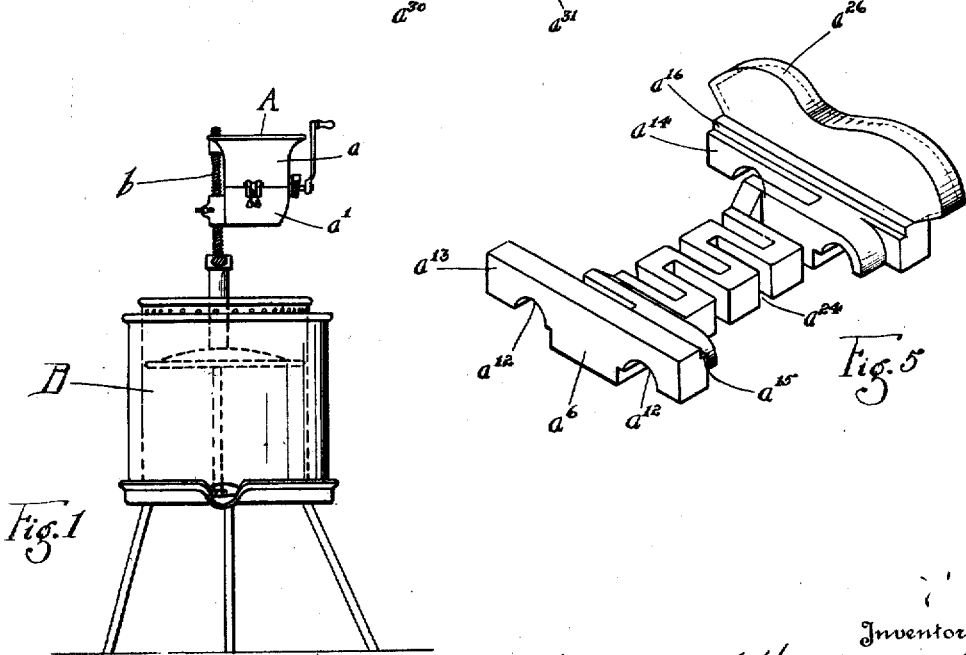
Inventor
Edward F. Happensack
By Walter F. Murray
Attorney

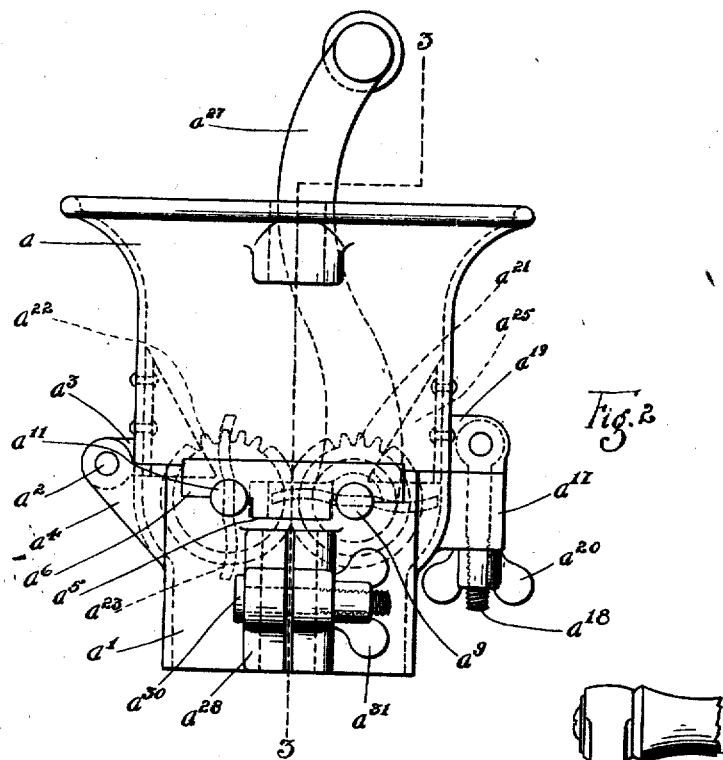
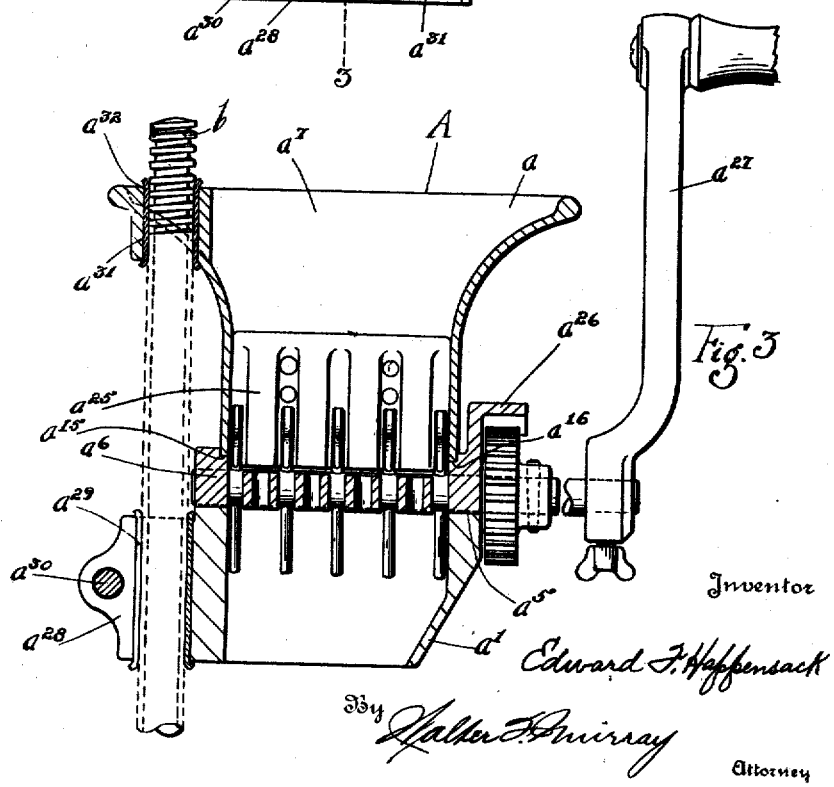

Patented Oct. 2, 1923.

1,469,724

UNITED STATES PATENT OFFICE.

EDWARD F. HAPPENSACK, OF CINCINNATI, OHIO, ASSIGNOR TO THE O. P. SCHRIVER COMPANY, OF CINCINNATI, OHIO, A CORPORATION OF OHIO.

MILL AND PRESS.

Application filed October 20, 1921. Serial No. 509,147.

*To all whom it may concern:*

Be it known that I, EDWARD F. HAPPENSACK, a citizen of the United States of America, and a resident of Cincinnati, in the county of Hamilton, and State of Ohio, have invented a new and useful Improvement in a Mill and Press, of which the following is a specification.

An object of my invention is to provide a device to tear up fruit such as apples, preparatory to producing cider by squeezing the juice therefrom by means of a press, such as is disclosed in my copending application, Serial No. 478,891.

Another object of my invention is to provide a device for the purpose stated that may be readily disassembled and cleaned.

Another object is to provide a device of the kind described adapted to be mounted on presses of the type referred to.

Another object is to provide a device for the purpose stated that is simple and efficient in construction and operation.

These and other objects are attained by the means described herein and disclosed in the accompanying drawings, in which Fig. 1 is an elevation of a press having mounted on it a device embodying my invention.

Fig. 2 is an enlarged elevation of a device embodying my invention.

Fig. 3 is a sectional view on line 3—3 of Fig. 2.

Fig. 4 is a plan view of the device shown in Fig. 2.

Fig. 5 is an enlarged perspective view of a shearing plate, forming a detail of my invention.

My invention comprises a casing having a way therethrough, in which way are revolubly mounted knives adapted to cut and crush fruit as it passes through the casing.

The casing A comprises an upper section $a$ and a lower section $a'$ hingedly mounted upon one another by means of the pivot $a^2$ extending through the hinge members $a^3$ and $a^4$ formed integral with the upper and lower sections respectively. Seats $a^5$ are formed upon the lower section $a'$ and are adapted to accommodate the shearing plate $a^6$ which plate extends substantially through the center of the way $a^7$ extending through the casing. The shearing plate is formed as shown in Fig. 5 so as to permit the knives $a^8$ mounted on the drive shaft $a^9$ and the knives $a^{10}$ on the driven shaft $a^{11}$ to cooperate therewith in tearing the fruit as it passes through the device. Suitable bearings are formed in the lower section to support shafts $a^9$ and $a^{11}$. The shearing plate carries blocks $a^{13}$ and $a^{14}$ which have bearings $a^{12}$ formed upon them, the bearings being adapted to accommodate the shafts $a^9$ and $a^{11}$. The blocks $a^{13}$ and $a^{14}$ are formed at opposite ends of the shearing plate and engage the upper and lower sections, the upper section being so constructed that its opposite lower edges will lie in the grooves $a^{15}$ and $a^{16}$ in the blocks when the upper section assumes its normal position in alignment with the lower section. The lower section is provided with a bifurcated lug $a^{17}$ between which the bolt $a^{18}$, which is pivotally mounted on lug $a^{19}$ formed on the upper section, may lie. A wing nut $a^{20}$ is adjustably mounted on the screw $a^{18}$ and provides means for securing the upper and lower sections in fixed relation upon one another. The shafts $a^9$ and $a^{11}$ have mounted upon them the intermeshing gears $a^{21}$ and $a^{22}$ respectively. Each of the shafts carry a number of prongs or knives $a^8$ and $a^{10}$, each of which has a flat portion $a^{23}$, which, in the operation of the device, are moved downwardly through the slots $a^{24}$ extending into the shearing plate alternately from opposite sides thereof. Suitable guide fingers $a^{25}$ are mounted upon the inner surfaces of the opposite sides of the upper section, and serve to direct fruit towards the shearing plate. The fingers $a^{25}$ are spaced so as to permit passage therebetween of the knives $a^{23}$. A flange $a^{26}$ is formed on the block $a^{14}$ and extends over the gears $a^{21}$ and $a^{22}$, thereby functioning as a protective screen or apron. A suitable crank $a^{27}$ is mounted upon the shaft $a^9$. The lower section of the casing has formed upon it a split bearing $a^{28}$ in which is mounted a split sleeve $a^{29}$ and through which sleeve the threaded standard $b$ of the press B may extend. Suitable means, such as the bolt $a^{30}$ and the wing nut $a^{31}$, are provided for securing the casing A upon the standard $b$. The upper section of the casing has a slot $a^{33}$ extending therethrough. This lot is in alignment with the split sleeve $a^{29}$ and carries a sleeve $a^{32}$ through which the upper end of the standard $b$ may extend. The sleeves $a^{29}$ and $a^{32}$ are provided to protect the threads formed on the standard $b$. The knives on the shafts $a^9$ and $a^{11}$ are preferably disposed at an angle of 90° to one another so that the knives on the shaft will be brought into alternate tearing cooperation with the shearing plate upon the fruit in the device.

In operation, fruit, such as apples, is placed in the upper portion of the casing A. As the crank is revolved, the knives on the respective shafts are alternately brought into cooperative relationship or shearing relationship with the shearing plate, whereby the apples are torn in suitable sections for pressing in the press B. As the apples are torn the fragments and the juice therefrom fall into the press B. After sufficient apples have been ground, they are pressed as disclosed in my referred to copending application, the juice therefrom being cider.

What I claim is:

1. In a device of the class described, the combination of a two section casing, the sections of which are hingedly mounted upon one another and which have ways therethrough which may be brought into alignment one with the other, a shearing plate mounted on one of the sections and extending through the way in said section, shafts mounted revolubly upon the last mentioned section and extending through the way, knives mounted on the shafts adapted to cooperate with the shearing plate in shredding fruits, and means to actuate the knives.

2. In a device of the class described, the combination of a two section casing, the sections of which are hingedly mounted upon one another and which have ways therethrough which may be brought into alignment one with the other, a shearing plate mounted on one of the sections and extending through the way in said section, shafts mounted revolubly upon the last mentioned section and extending through the way, knives mounted on the shafts adapted to cooperate with the shearing plate in shredding fruits, means to actuate the knives, and means to mount the casing upon a standard.

3. In a device of the class described, the combination of a casing comprising upper and lower sections hingedly mounted upon one another and having ways therethrough which may be brought into alignment one with the other, a shearing plate adapted to be mounted upon the casing and extending through the way, guide fingers mounted upon one of the sections adapted to direct fruit passing through the way toward the shearing plate, and knives extending into the way adapted to cooperate with the shearing plate in shredding fruit passing through the way.

4. In a device of the class described, the combination of a casing having upper and lower sections hingedly mounted on one another and having a way through said sections which may be brought into alignment one with the other, means to lock the upper section upon the lower section, and means comprising a shearing plate and cooperating rotatable knives mounted upon the sections at substantially their place of joinder for shredding fruit passing through the way.

5. In a device of the class described, the combination of a casing having upper and lower sections hingedly mounted on one another and having a way through said sections which may be brought into alignment one with the other, means to lock the upper section upon the lower section, means comprising a slotted plate and rotatable knives mounted upon the sections at substantially their place of joinder adapted to shred fruit passing through the way, and means to mount the casing upon a standard.

6. In a device of the class described, the combination of a casing having a way therethrough, a shearing plate having slots therein, said slots extending into the plate from the sides thereof, the adjacent slots extending inwardly in alternate sequence from opposite sides of the shearing plate, shafts extending through the way, and knives mounted on the shafts adapted to pass through the slots in the shearing plate whereby fruit passing through the way may be shredded.

7. In a device of the class described, the combination of a casing having a way therethrough, a shearing plate having slots therein, said slots extending into the plate from the sides thereof, the adjacent slots extending inwardly in alternate sequence from opposite sides of the shearing plate, parallel shafts extending through the way, one each of which is mounted upon opposite sides of the shearing plate, intermeshing gears mounted on the shafts, knives mounted upon the shafts adapted to pass through the slots in the shearing plate, and a crank mounted on one of the shafts.

8. In a device of the class described, the combination of a casing having a way therethrough, a shearing plate having slots therein, said slots extending into the plate from the sides thereof, the adjacent slots extending inwardly in alternate sequence from opposite sides of the shearing plate, parallel shafts extending through the way, one each of which is mounted upon opposite sides of the shearing plate, intermeshing gears mounted on the shafts, knives mounted upon the shafts adapted to pass through the slots in the shearing plate, a crank mounted on one of the shafts, and guide fingers within the casing adapted to direct fruit towards and upon the shearing plate.

9. In a device of the class described, the combination of a casing having a way therethrough, a shearing plate having slots therein, said slots extending into the plate from the sides thereof, the adjacent slots extending inwardly in alternate sequence from opposite sides of the shearing plate, parallel shafts extending through the way, one each of which is mounted upon opposite sides of the shearing plate, intermeshing gears mounted on the shafts, knives mounted upon the shafts adapted to pass through the slots in the shearing plate, a crank mounted on one of the shafts, guide fingers within the casing adapted to direct fruit towards and upon the shearing plate, and means to mount the casing upon a standard.

In testimony whereof, I have hereunto subscribed my name this 18th day of October, 1921.

EDWARD F. HAPPENSACK.